(12) United States Patent
Duckeck

(10) Patent No.: US 6,338,019 B1
(45) Date of Patent: Jan. 8, 2002

(54) METHOD FOR TRANSMITTING LOCATION-RELATED INFORMATION

(75) Inventor: Ralf Duckeck, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/501,923

(22) Filed: Feb. 10, 2000

(30) Foreign Application Priority Data

Feb. 10, 1999 (DE) .......................................... 199 05 431

(51) Int. Cl.[7] .............................................. G08G 1/123
(52) U.S. Cl. ........................ 701/200; 701/117; 455/412
(58) Field of Search .................................. 701/200, 117, 701/118, 119, 208, 211; 455/186.1, 185.1, 412, 456, 457; 340/905, 990, 991, 993, 995, 996

(56) References Cited

U.S. PATENT DOCUMENTS

| | | | | |
|---|---|---|---|---|
| 5,303,401 A | * | 4/1994 | Duckeck et al. | 455/186.1 |
| 5,345,606 A | * | 9/1994 | Duckeck et al. | 455/186.1 |
| 5,465,088 A | * | 11/1995 | Braegas | 340/905 |
| 5,892,463 A | * | 4/1999 | Hikita et al. | 340/995 |
| 5,933,094 A | * | 8/1999 | Goss et al. | 340/905 |
| 5,991,610 A | * | 11/1999 | Ruhl et al. | 455/186.1 |
| 6,023,654 A | * | 2/2000 | Mohlenkamp | 701/208 |
| 6,104,316 A | * | 8/2000 | Behr et al. | 340/995 |
| 6,111,539 A | * | 8/2000 | Mannings et al. | 342/357.09 |

* cited by examiner

Primary Examiner—Tan Nguyen
(74) Attorney, Agent, or Firm—Kenyon & Kenyon

(57) ABSTRACT

In a method for transmitting location-related information between a navigational device, which contains a first location database in which location coordinate pairs and descriptors are assigned to location specifications, and a receiver for digitally coded traffic messages, the receiver containing a second location database, location coordinate pairs, in addition to descriptors, are stored in the location specifications contained in the second location database, in a receiver and a navigational device. Along with the information to be transmitted, at least the coordinate pair is transmitted of the location to which the information relates. With the assistance of at least the transmitted coordinate pair, the location specification is selected from the given location database.

9 Claims, 1 Drawing Sheet

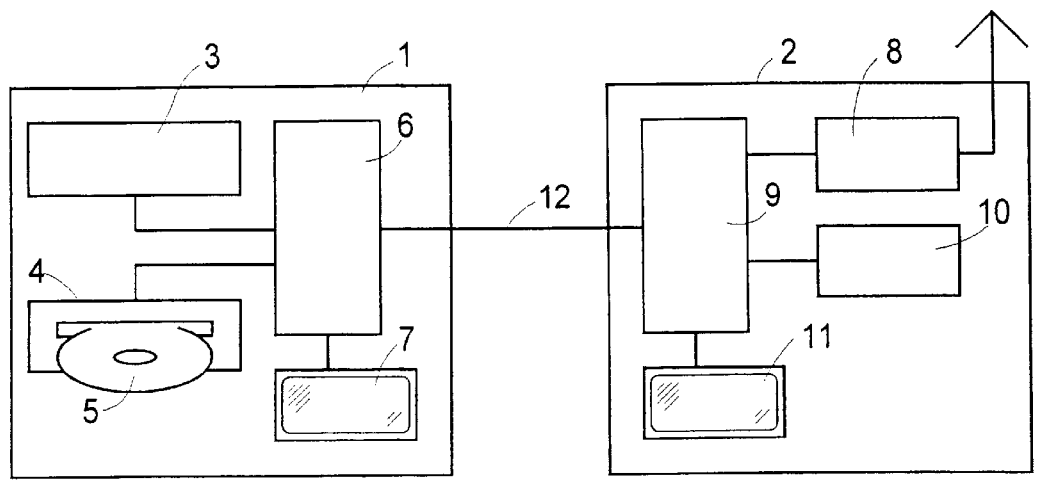
Fig.1
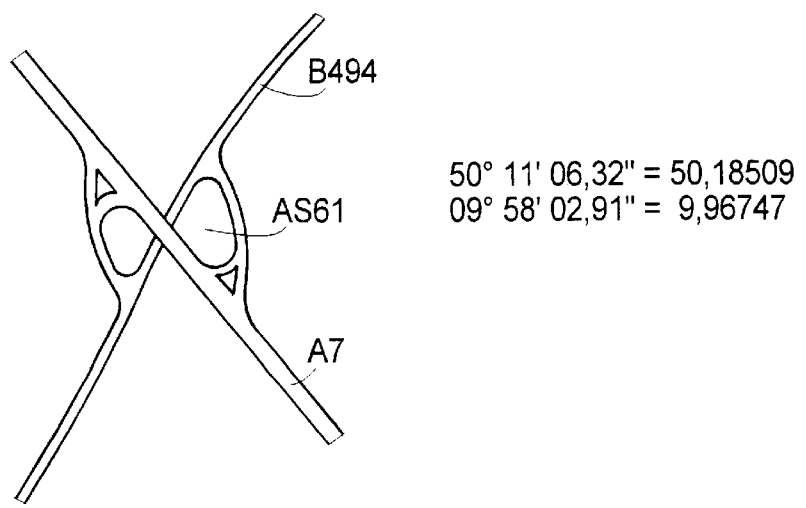
50° 11' 06,32" = 50,18509
09° 58' 02,91" = 9,96747
Fig.2
ILOC: +50,18509+9,96747A7B494AS61
Fig.3
TMC-Code
| LOC-CODE | ROADNR | FIRST NAME | NEG OFFSET | POS OFFSET | EXIT NUMBER | WGS84 |
|---|---|---|---|---|---|---|
| 12337 | A7 | Hildesheim-Drispenstedt | 12336 | 12338 | 61 | 50° 11' 06"<br>09° 58' 03" |
Fig.4

METHOD FOR TRANSMITTING LOCATION-RELATED INFORMATION

FIELD OF THE INVENTION

The present invention relates to a method for transmitting location-related information between a navigational device, which contains a first location database in which location coordinate pairs and descriptors are assigned to the location specifications, and a receiver for digitally coded traffic messages, the receiver containing a second location database, the present invention also relating to a receiver, suited for carrying out the method, and a navigational device.

BACKGROUND INFORMATION

In motor vehicles, electronic devices providing the driver with information are in increasing use. In order to guide the driver to a selected destination, navigational devices have become known in which, on the basis of a digital street map and sensors for determining the specific location of the vehicle, for example satellite navigational devices, the most favorable possible route to the destination is calculated and corresponding information is given to the driver. In this context, the so-called digital street map is stored in a location database—hereinafter also called the map database—in which the locations necessary for navigation are stored along with their geographic coordinates.

For informing the driver regarding traffic hindrances, various traffic radio-communication systems are known. In this category is the TMC system, in which digitally coded traffic messages are generated on the transmitter side and are decoded in receivers. Details in this regard are described in European Patent No. 0 263 332, German Patent No. 38 10 177, and German Patent No. 38 10 179.

For decoding these digitally coded traffic messages, the receiver must have at least one location database, in which selected locations are listed, classified according to street, for example connecting locations (connections) and intersections.

However, the navigational devices of different manufacturers have different data formats and referencing systems within the map database. As a result, no exchange of information regarding a specific location is possible between different systems. To make navigational devices to some extent compatible with each other and able to be addressed by a service provider that actualizes the map databases, work is currently proceeding on a project of the European Commission—called EVIDENCE—in which an ILOC method (ILOC=Intersection Location) is proposed. However, these suggestions do not result in the known navigational devices being able to take into account digitally coded traffic messages without manual inputs.

SUMMARY OF THE INVENTION

Therefore, an object of the present invention is to make possible the exchange of location-related information between a navigational device and a receiver for digitally coded traffic messages.

This object is achieved through the fact that, in addition to descriptors, location coordinate pairs are stored in the location specifications contained in the second location database, that along with the information to be transmitted, at least the coordinate pair is transmitted of the location to which the information relates, and that with the assistance of at least the transmitted coordinate pair, the location specification is selected from the respective location database.

As a result of the method according to the present invention, received digital traffic messages can be transmitted from the receiver to a navigational device, so that, for example, route suggestions determined by the navigational device can automatically be changed in accordance with any traffic disturbances that arise, or traffic messages having previously arrived and been stored are taken into account for a recalculation of a travel route.

The method according to the present invention can also function to transmit information from a navigational device to a receiver for digitally coded traffic messages, for example, on the basis of the coordinates, the appropriate location in the table in the TMC system can be found by approximation and comparison of the descriptors, and the method can be used in a receiver for digital traffic messages—hereinafter also known as a TMC receiver—to create a message and to communicate it to the user using language. In addition, the specific position can be fed from the navigational device to the TMC receiver, in order to be used in making a selection from the received traffic messages.

Even if the coordinate pairs are formed according to the same standard, for example WGS84, slight variations are possible due to their different sources. In addition, the locations are differently defined in the TMC system and in the navigational devices. Therefore, in refining the method according to the present invention, provision is made that, for purposes of selection, coordinate pairs of the respective location database are used that lie within a tolerance range of the transmitted coordinate pairs.

Specifying the coordinate pair is not determinative for all locations. Thus, for example, locations situated in different planes, i.e., those on and under a bridge, have the same coordinate pair but must be distinguished in the specific system. To exclude errors, in a further refinement of the method according to the present invention, provision is made that, along with the information, descriptors are transmitted that are compared with similar descriptors presumably present in the respective location database. In particular, the transmitted descriptors can be street numbers and/or junction numbers.

Traffic messages that are not highway-related cannot always have a clear location specification assigned to them. In this case, a so-called LLOC (Link Location) is created, the transmitted descriptors being the end points of a street segment.

Advantageous embodiments of the method according to the present invention arise from the fact that information is received from the receiver and is transmitted to the navigational device, or that the information is transmitted from the navigational device to the receiver for digitally coded traffic messages.

The object according to the present invention is achieved in a receiver for digitally coded traffic messages by a device for transmitting location-related information between a navigational device, which contains a first location database in which location coordinate pairs and descriptors are assigned to location specifications, and the receiver, which contains a second location database, location coordinate pairs, in addition to descriptors, being stored in the location specifications contained in the second location database, and, along with the information to be transmitted, it being possible to transmit at least the coordinate pair of the location to which the information relates, making it possible to select the location specification from the given location database.

A navigational device according to the present invention, containing a first location database in which location coordinate pairs and descriptors are assigned to the location specifications, is embodied as a device for transmitting location-related information between the navigational device and a receiver for digitally coded traffic messages, the receiver containing a second location database, in which, in addition to descriptors, location coordinate pairs are stored in the location specifications contained there, and, along with the information to be transmitted, it being possible to transmit at least the coordinate pair of the location to which the information relates, making it possible to select the location specification from the given location database.

BRIEF DESCRIPTION OF THE DRAWINGS

FIG. 1 shows schematically a connection between a navigational device and a receiver for digitally coded traffic messages.

FIG. 2 shows a street intersection.

FIG. 3 shows a coding of the location of this street intersection for a navigational device.

FIG. 4 shows a coding of the same location for a TMC receiver.

DETAILED DESCRIPTION

In FIG. 1, the only parts schematically depicted of a navigational device 1 and a TMC receiver 2 are those that are important to understand the present invention. Navigational device 1 contains an orientation device, for example a GPS receiver 3, and a disk drive 4 having a CD-ROM 5, on which the map database is stored. A microcomputer 6 functions, inter alia, for calculating the travel routes and for generating the travel recommendations required in the given situation, for example "turn left," which can be displayed on a display 7 or—which is not depicted—can be output using a speech synthesizer and a speaker.

Receiver 2 has a receiving part 8, a microcomputer 9, and a memory device 10, which, inter alia, functions to store the location database. The TMC receiver 2 also has an output device, for example a display 11. This functions to display the received and decoded traffic messages in addition to other information, for example the adjusted transmitter.

Microcomputers 6, 9 are connected to each other using appropriate well-known interfaces via a data line 12, so that information in accordance with the present invention can be exchanged.

In the example depicted on the basis of FIGS. 2 through 4, information is transmitted which concerns connecting location 61 of highway A7, depicted in FIG. 2. The connecting location connects federal highway B494 to highway A7 and has the coordinate pair depicted in FIG. 2, both in conventional angular units and in decimals.

FIG. 3 shows the coding of the connecting location according to ILOC, the two coordinates being given, initially preceded by a plus sign, whereupon the two streets, which intersect at the connecting location, and then the connecting location itself follow.

FIG. 4 depicts a line from a location database for TMC messages in accordance with the ALERT Standard EN 12313-1. After a location code for the connecting location depicted in FIG. 2, there follows the street number, namely A7, and then the first name. Further names are possible in accordance with the ALERT Standard, but are not depicted here. There then follows a further location code as "negative offset," by which the preceding connection location is meant, and as "positive offset" the subsequent connecting location. Finally, the number of connecting location 61 is given. For a compatible transmission of data to or from a navigational device, the location database also includes for each location code a coordinate pair in accordance with WGS84.

What is claimed is:

1. A method for transmitting location-related information between a navigational device, which contains a first location database in which location coordinate pairs and descriptors are assigned to location specifications, and a receiver for digitally coded traffic messages, the receiver containing a second location database, the method comprising the steps of:

storing, in addition to descriptors, location coordinate pairs in location specifications contained in the second location database;

transmitting, along with the information to be transmitted, at least a coordinate pair of a location to which the information relates; and with the assistance of at least the transmitted coordinate pair, selecting a location specification from a respective location database.

2. The method according to claim 1, further comprising the step of, for purposes of selection, using coordinate pairs, of the respective location database, lying within a tolerance range of the transmitted coordinate pair.

3. The method according to claim 1, further comprising the steps of:

transmitting the descriptors; and comparing the descriptors in the respective location database with similar descriptors.

4. The method according to claim 3, wherein the transmitted descriptors include at least one of: street numbers and junction numbers.

5. The method according to claim 3, wherein the transmitted descriptors include end points of a street segment.

6. The method according to claim 1, further comprising the step of sending the information from the receiver to the navigational device.

7. The method according to claim 1, further comprising the step of sending the information from the navigational device to the receiver.

8. A receiver for digitally coded traffic messages, comprising:

means for transmitting location-related information between a navigational device, which contains a first location database in which location coordinate pairs and descriptors are assigned to location specifications, and the receiver;

a second location database containing location specifications which store location coordinate pairs and descriptors; and means for transmitting, along with the information to be transmitted, at least a coordinate pair of a location to which the information relates, making it possible to select a location specification from a particular location database.

9. A navigational device comprising:

a first location database in which location coordinate pairs and descriptors are assigned to location specifications;

means for transmitting location-related information between the navigational device and a receiver for digitally coded traffic messages, the receiver containing a second location database, the second location database containing location specifications which store location coordinate pairs and descriptors; and means for transmitting, along with the information to be transmitted, at least a coordinate pair of a location to which the information relates, making it possible to select a location specification from a particular location database.

\* \* \* \* \*